United States Patent [19]
Collignon

[11] 3,804,117
[45] Apr. 16, 1974

[54] FAUCET
[75] Inventor: Jean Collignon, Chamonix, France
[73] Assignee: Abraco S.A., Chamonix, France
[22] Filed: Apr. 21, 1972
[21] Appl. No.: 246,165

[30] Foreign Application Priority Data
Apr. 21, 1971    France .............................. 71.16277

[52] U.S. Cl. ............................................ 137/606
[51] Int. Cl. ........................................... F16k 19/00
[58] Field of Search ....................... 137/606; 4/192; 29/157.1 R

[56] References Cited
UNITED STATES PATENTS
2,012,091   8/1935   Zolleis ........................... 137/606 X
1,156,888   10/1915  Coup .................................... 4/192
1,929,536   10/1933  Shulte, Jr. .......................... 137/606
2,546,327   3/1951   Young ............................. 137/606 X Primary Examiner—Robert G. Nilson
Attorney, Agent, or Firm—Larson, Taylor & Hinds

[57] ABSTRACT

A faucet comprises a body of rustproof material. Openings are provided in the body for inserting connectors of a readily machineable material different than the rustproof material. The connectors are machined to provide at least two fluid inlet means and a control valve for each fluid inlet means. After inserting the connector, the valve body is closed with a plate of the rustproof material.

2 Claims, 3 Drawing Figures

FAUCET

The present invention relates to faucet units fabricated from rustless material. Such known faucet units comprise, at each of their ends, control means for each faucet and, approximately in their center, water intake means and a faucet nozzle comprising a jet breaker device. The faucets of such units are provided with connectors fitted by force or attached in any other way in each end of the unit, each connector being machined to receive the elements of said control means and said water intake means. Such faucet units are difficult to make because they have to be shaped, bent and machined at their ends. Further, reinforcement of one of their ends with a connector of rustless material fairly identical with that used for the faucet unit is very difficult. Finally, to assure fluid tightness to the assembly, it is necessary to place seals between the connector and the body of the faucet unit, both being made from rustless material.

The faucet unit according to the present invention is proposed to remedy these drawbacks in a simple, effective, aesthetic and inexpensive way. In accordance with the present invention, the faucet unit comprises, at each of its ends, a connector, of soft material such as easily machineable metal, fitted into said body and concealed by a plate of rustless material identical with that of the body of the faucet unit, thus avoiding difficult matching of a connector of rustless material and the provision of a fluid tight joint between these materials. Further, the faucet unit is provided with a socket for attachment of a fluid outlet nozzle. The nozzle can be made in any shape and easily, because it does not involve machining to receive the control means of said faucet. This embodiment of the invention provides the advantage of permitting the adaptation on the same faucet unit of different types of nozzles, depending on the shapes desired and the users' taste.

According to a preferred embodiment of the invention, the faucet unit is made up of a shaped tube of rustless material, shaped, for example, in a square section. The tube comprises, at each of its ends, fastening means for connecting the water intake and mounting the faucet control means. These fastening means, such as connectors made from a soft, easily machineable metal material, are fitted by force into the shaped tube, then machined and tapped or threaded to receive the water intake pipe connections and the faucet control means. Between its two ends, approximately in its middle, the faucet unit includes a socket for attachment of the fluid outlet nozzle of said faucet.

The invention will be better understood by referring to the following description and the accompanying drawing giving, by way of non-limiting example, the preferred embodiments of the faucet unit.

Figure 1:
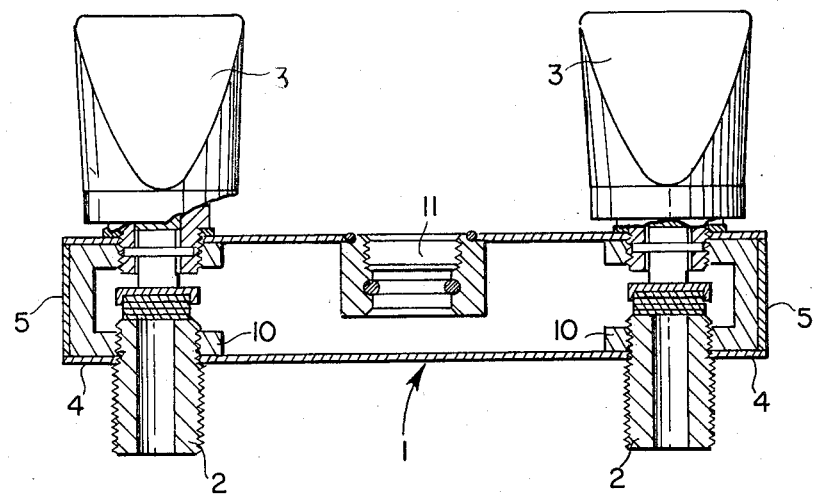
FIG. 1 is a view in lengthwise section of a faucet unit according to the invention.

In FIG. 1, the faucet unit 1, made of a standard shaped tube of rustproof material such as stainless steel, receives, at each of its ends, a water intake socket 2 and a faucet control body 3. Each end 4 of the faucet unit 1 comprises a plate 5, obtained from a rustless material identical with that of body 1, and a reinforcing connector 10, fitted by force into the shaped tube which constitutes faucet unit 1. The connector made of a soft metal material, such as brass, is easy to machine, assuring fluid tightness to the fitting. Plate 5 is secured to the valve body by any conventional means such as adhesive, brazing, soldering, or the like. Advantageously connectors 10 will be obtained from standard shapes. Between the two control valves 3, approximately in the middle of faucet unit 1, a socket 11, fitted and welded to the inside of the unit, permits the attachment of the faucet fluid outlet nozzle, not shown.

Figure 2:
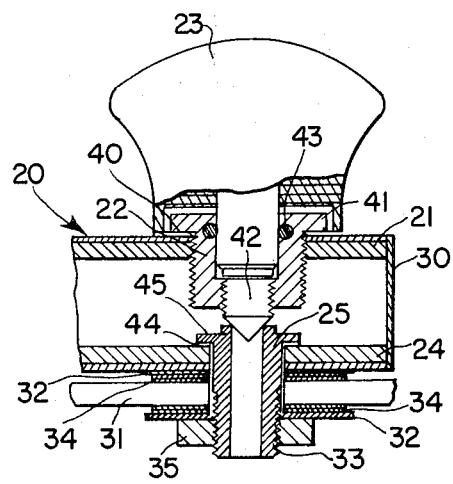
FIG. 2 is a view in partial lengthwise section of a faucet unit according to an alternative embodiment.

In FIG. 2, faucet unit 20, incompletely shown, receives, at 21, cap 22 for fastening of control handle 23, and, at 24, seat 25 for connecting the fluid inlet conduit 33. A plate 30, obtained from a rustless material identical with that of unit 20, blocks the end of said unit 20. The faucet is attached to support 31 by means of seat 25 whose threaded part 33 passes through support 31. Nut 35, screwed on threaded part 33, immobilizes faucet unit 20 on said support. Advantageously, two elastic joints 34, each capped by a washer 32, are placed on both sides of support 31. The outside fluid tightness of such a faucet is assured by a joint 40, such as a weld, securing shoulder 41 of cap 22 to faucet unit 20. The inside fluid tightness on blocking needle 42 is assured by an "O" ring toric seal 43 housed in cap 22, and, on the other hand, by an "O" ring seal 44 pressed between collar 45 of seat 25 and faucet unit 20.

Figure 3:
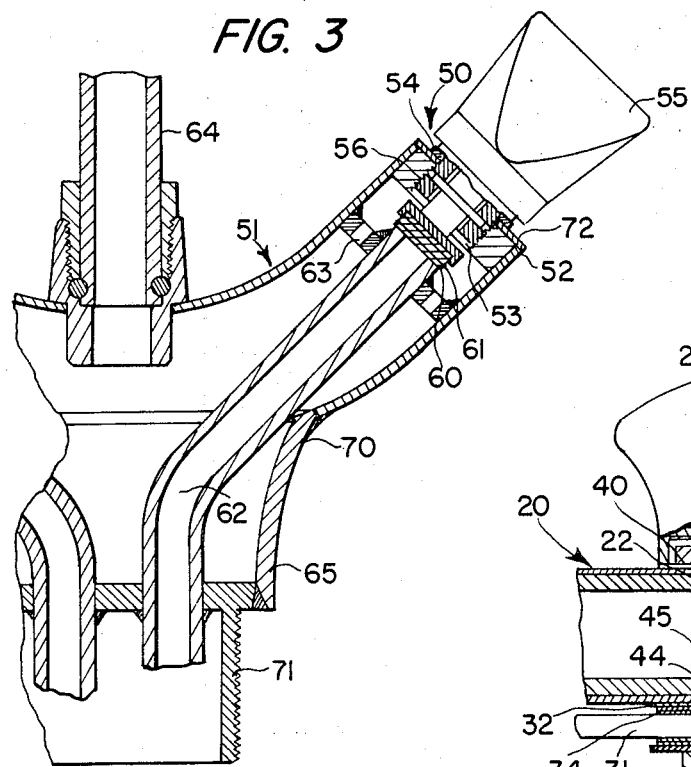
FIG. 3 is a view in partial section of a faucet mounted at the end of a unit of said faucets.

In FIG. 3, the faucet is placed at end 50 of faucet unit 51. Piece 52, with an outside shape corresponding to the one inside of the shaped tube of faucet unit 51, comprises a tapped hole 53, corresponding to threaded part 54 of fastening cap 57 which carries control handle 55. In such an embodiment of the faucet, the fluid intake comes through the inside of seat 60 of valve 61, the seat being formed by the end of pipe 62. Orifices 63, made in the support plate of pipe 62, permit the flow of the fluid, when valve 61 is open, toward nozzle 64, incompletely shown, of said faucet. Support ring 65, welded at 70 to faucet unit 51, is solid with a fastening piece 71 which makes it possible to attach the mixer unit of the faucets. End 50 of faucet unit 51 is closed by a plate 72 obtained from a material identical with that of said unit 51.

To obtain a good concentricity of the valve control bodies, on the one hand, and of the corresponding seat, on the other, their tapped fastening bores are advanageously made during the same operation on a given end support of the unit.

It will be apparent that it would not be going outside of the scope of the invention to change the shapes, dimensions, proportions or appearance of the various constitutive elements of the faucet unit, elements which can be obtained from any conventional faucet materials or combination of materials and undergo any conventional treatments.

Further, the faucet unit can be attached in any way on all types of fluid handling apparatus or supports, comprise any conventional means for connecting to the pipes for water or other fluids, without thereby going outside the scope of the invention.

Finally, the faucet unit could be provided with one or more sockets for attachment of the faucet nozzles, nozzles which can be made in any shape, dimension, appearance and nature.

What is claimed is:

1. In a faucet unit provided with two fluid inlets and a control valve for each inlet and having a body fabricated of rustproof material, the improvement wherein each fluid inlet and associated control valve is secured to said body by means of a connector fabricated of a readily machined material different from said rustproof material, said connector being secured by force fit within and sealing an opening in said body provided therefor, said opening being closed by a plate of said rustproof material.

2. An improved faucet unit accordng to claim 1 wherein said fluid inlet means are screwed into said connector.

* * * * *